(12) United States Patent
Miki

(10) Patent No.: US 8,495,681 B2
(45) Date of Patent: Jul. 23, 2013

(54) DISPLAY PROCESSING APPARATUS, DISPLAY PROCESSING SYSTEM, AND DISPLAY PROCESSING METHOD

(75) Inventor: Nanami Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 829 days.

(21) Appl. No.: 12/273,859

(22) Filed: Nov. 19, 2008

(65) Prior Publication Data

US 2009/0172737 A1    Jul. 2, 2009

(30) Foreign Application Priority Data

Nov. 21, 2007    (JP) ................................ P2007-302252

(51) Int. Cl.
*G06F 3/00* (2006.01)
*G06F 13/00* (2006.01)
*H04N 5/445* (2006.01)

(52) U.S. Cl.
USPC ............................................. 725/46; 725/44

(58) Field of Classification Search
USPC ............. 725/46, 43, 2, 44, 47, 140, 142, 152, 725/109
See application file for complete search history.

(56) References Cited

U.S. PATENT DOCUMENTS

| | | | | |
|---|---|---|---|---|
| 5,907,323 | A * | 5/1999 | Lawler et al. ................... | 725/41 |
| 7,454,775 | B1 * | 11/2008 | Schaffer et al. ................. | 725/46 |
| 7,966,334 | B1 * | 6/2011 | Bezos et al. .................... | 707/748 |
| 2003/0145326 | A1 * | 7/2003 | Gutta et al. ..................... | 725/46 |
| 2004/0237105 | A1 | 11/2004 | Ha | |
| 2006/0085416 | A1 | 4/2006 | Naoi et al. | |
| 2008/0172696 | A1 | 7/2008 | Furusawa et al. | |

FOREIGN PATENT DOCUMENTS

| | | |
|---|---|---|
| EP | 1 083 746 | 3/2001 |
| EP | 1 085 757 | 3/2001 |
| EP | 1 091 575 | 4/2001 |
| EP | 1 784 009 | 5/2007 |
| GB | 2 343 076 | 4/2000 |
| JP | 2004 194095 | 7/2004 |
| JP | 2005 122321 | 5/2005 |
| JP | 2005 175850 | 6/2005 |
| JP | 2006 41668 | 2/2006 |
| JP | 2006 229998 | 8/2006 |
| JP | 2007 28463 | 2/2007 |
| JP | 2007 104312 | 4/2007 |
| WO | WO 2005 015902 | 2/2005 |
| WO | WO 2006 038529 | 4/2006 |

* cited by examiner

*Primary Examiner* — Ngoc Vu
(74) *Attorney, Agent, or Firm* — Wolf, Greenfield & Sacks, P.C.

(57) ABSTRACT

A display processing apparatus is disclosed. The display processing apparatus includes: a unit configured to receive a content list from a content server; a content storage portion configured to store a content; a contract information storage portion configured to store contract information; a viewing history information storage portion configured to store viewing history information; a unit configured to create a recommended content list from the content list based on the contract information and the viewing history information, the recommended content list being one of a list of contents capable of being viewed and a list of contents capable of being stored in the content storage portion; a screen capable of displaying the recommended content list; and a unit configured to display the recommended content list in a predetermined area other than a center area of the screen, the recommended content list being smaller than the screen.

10 Claims, 9 Drawing Sheets

| Viewing history information ||
|---|---|
| Genre name | Viewing count |
| Sports | 20 |
| Movie | 10 |
| ⋮ | ⋮ |
| Drama | 15 |
| Music | 5 |
| ⋮ | ⋮ |

FIG.2

| Contents obtainable based on contract information |
|---|
| Sport a |
| Sport b |
| Movie a |
| Movie b |
| Drama a |
| Music a |
| ⋮ |

FIG.3

| Preference level information ||
|---|---|
| Program name | Preference level |
| Sport a | 20 |
| Sport b | 20 |
| Movie a | 10 |
| Movie b | 10 |
| Drama a | 15 |
| Music a | 5 |

FIG.6

| Preference level sort information ||
|---|---|
| Program name | Preference level |
| Sport a | 20 |
| Sport b | 20 |
| Drama a | 15 |
| Movie a | 10 |
| Movie b | 10 |
| Music a | 5 |

↓

| Recommended content list 20 |
|---|
| Sport a |
| Drama a |
| Movie a |

FIG.7

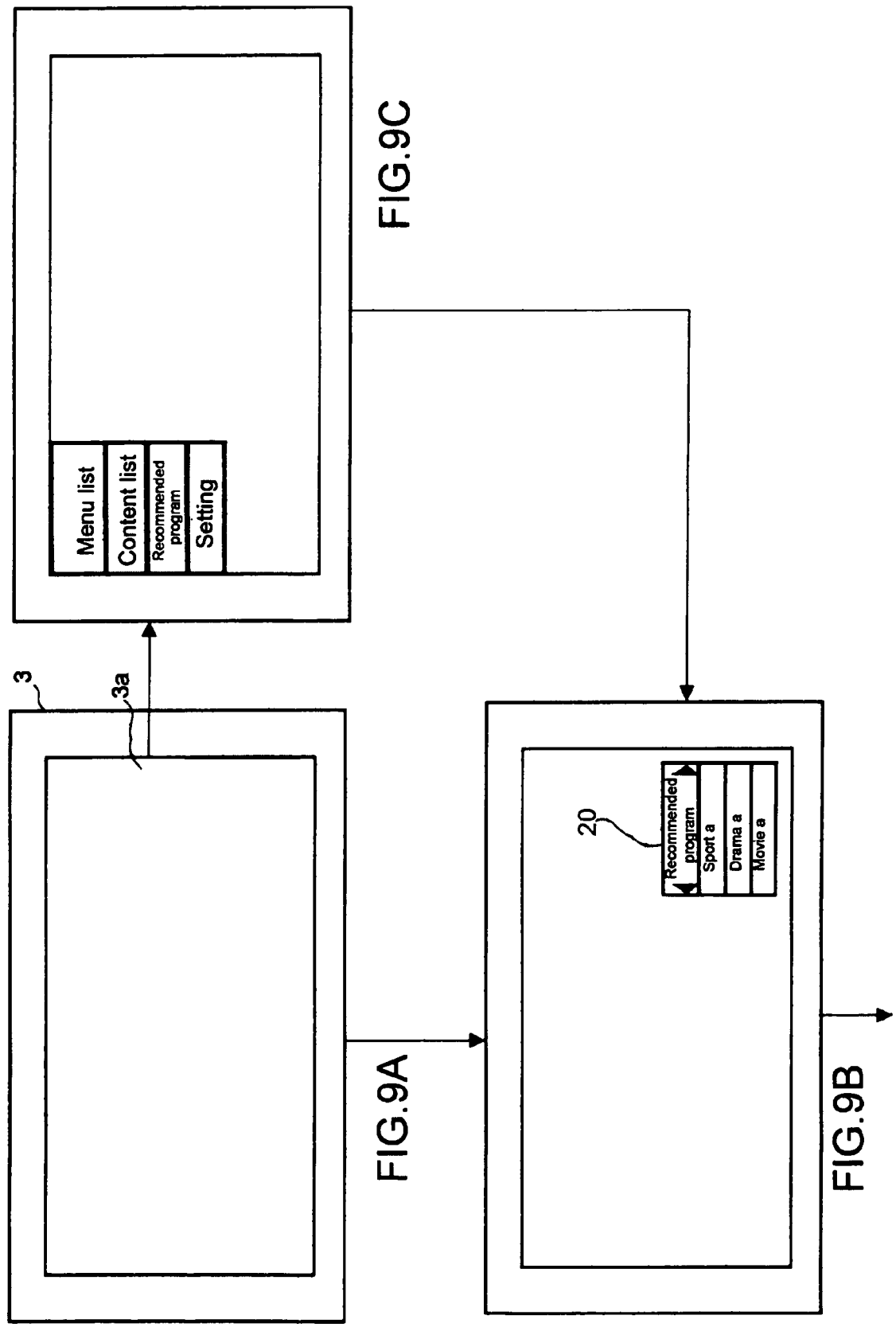

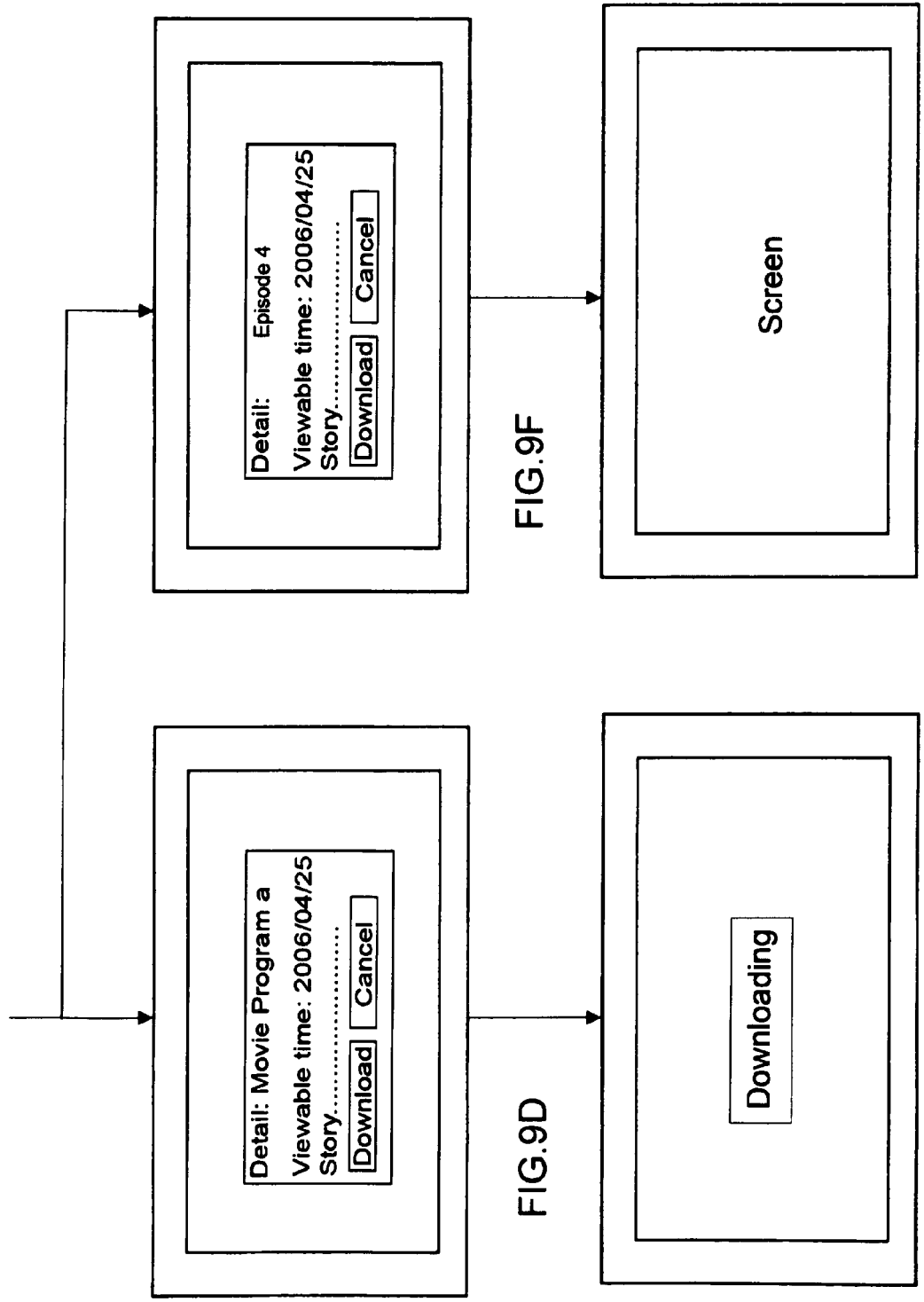

DISPLAY PROCESSING APPARATUS, DISPLAY PROCESSING SYSTEM, AND DISPLAY PROCESSING METHOD

CROSS REFERENCES TO RELATED APPLICATIONS

The present invention contains subject matter related to Japanese Patent Application JP 2007-302252 filed in the Japanese Patent Office on Nov. 21, 2007, the entire contents of which being incorporated herein by reference.

BACKGROUND OF THE INVENTION

1. Field of the Invention

The present invention relates to a display processing apparatus, a display processing system, and a display processing method.

2. Description of the Related Art

In related art, a receiver of an Internet protocol television (IPTV) is equipped with a function of displaying a content list on a screen so that a user can select a content while viewing another content. The content list is, for example, an electronic content guide (ECG) and includes titles of contents put together on a screen. Generally, in the content list, contents are displayed at a maximum. Therefore, when the user tries to display the content list while watching a program, reproduction of the program is temporarily stopped and the content list is displayed, and according to a selection by the user, another program is displayed in many cases.

Further, the receiver of the IPTV is equipped with a function of displaying a recommended content list based on a user's viewing history on the screen.

In a case where the recommended content list or a list including a large amount of information is displayed, the recommended content list or the list including the large amount of information is overlapped with the screen that is being watched, or the screen is scaled down (see, for example, Japanese Patent Application Laid-open No. 2006-41668, paragraphs [0019], [0020], and FIGS. 2 and 3).

SUMMARY OF THE INVENTION

However, contents on an IPTV are viewed in a different manner from programs on a free broadcast (free to air). On the IPTV, contents which can be viewed by a user are limited according to a contract, and thus the user cannot necessarily view a content indicated on the recommended content list. Therefore, there arises a problem in that the user has to confirm, on another screen, whether a content in the recommended content list can be viewed.

A problem further arises in the following case. In a case of displaying the list including a large amount of information with the list being overlapped with the screen watched or with the screen being scaled down, a large part of the screen is hidden, or screen viewability is poor.

In view of the above-mentioned circumstances, it is desirable to provide a display processing apparatus, a display processing system, and a display processing method for displaying the recommended content list that indicates contents capable of being viewed by the user based on contract information and viewing history information, with the recommended content list being smaller than the screen.

According to an embodiment of the present invention, there is provided a display processing apparatus. The display processing apparatus includes: a unit configured to receive a content list from a content server; a content storage portion; a contract information storage portion; a viewing history information storage portion; a unit configured to create a recommended content list from the content list based on the contract information and the viewing history information, the recommended content list being one of a list of contents capable of being viewed and a list of contents capable of being stored in the content storage portion; a screen; and a unit configured to display the recommended content list in a predetermined area other than a center area of the screen, the recommended content list being smaller than the screen. The content storage portion is configured to store a content. The contract information storage portion is configured to store contract information. The viewing history information storage portion is configured to store viewing history information. The screen is capable of displaying the recommended content list.

Herein, the predetermined area includes an area in proximity to a corner portion of the screen, for example.

In the embodiment of the present invention, since the recommended content list that is the list of the contents capable of being viewed or the list of the contents capable of being stored in the content storage portion is created based on the contract information, all the contents in the recommended content list can be viewed by the user or can be stored. As a result, the user can reliably and easily select a content without confirming whether each content in the recommended content list can be viewed. In addition, in the past, in a case where the recommended content list is not smaller than the screen, the content that is being viewed has been stopped to display the recommended content list because the recommended content list hides the screen. According to the embodiment of the present invention, the recommended content list that is smaller than the screen is displayed in the predetermined area other than the center area of the screen, which can prevent the viewing screen from being hidden by the recommended content list during viewing of the content, and allows the user to easily select a content while watching the screen. Thus, the smaller recommended content list can increasingly bring opportunities of casually selecting other contents to the user.

The recommended content list includes a plurality of contents displayed in a list form. By selecting one of the plurality of contents, the selected content can start to be viewed or to be stored in the content storage portion.

With this structure, the user can easily view the selected content or easily store the content in the content storage portion by selecting a content from the recommended content list.

The contract information includes one of first contract information and second contract information. The first contract information indicates that contents provided by the content server are all capable of being subjected to one of viewing and storing into the content storage portion, and the second contract information indicates that contents provided by the content server are capable of being subjected to one of viewing and storing into the content storage portion to a limited extent.

With this structure, based on the first contract information and the second contract information, the recommended content list and the contents can be provided to the user.

One of a plurality of contents is selected from the recommended content list to display detailed information of the selected content in an area on the screen, other than an area where the recommended content list is displayed on the screen.

With this structure, the detailed information of the content selected by the user from the recommended content list can be displayed in the area on the screen, other than the area where the recommended content list is displayed. The recommended content list and the detailed information can be viewed at the same time, which can further increase the operability.

The unit configured to create the recommended content list creates the recommended content list based on a content relating to a content that is being viewed. The content relating to the content that is being viewed refers to a content that belongs to the same genre as the content being viewed, for example.

With this structure, the recommended content list relating to the content that is being viewed can be obtained. Thus, while watching a sports program, another sports program can be easily selected.

According to another embodiment of the present invention, there is provided another display processing apparatus configured to receive a content list and output a recommended content list to a display apparatus. The display processing apparatus includes: a unit configured to receive the content list from a content server; a content storage portion; a contract information storage portion; a viewing history information storage portion; a unit configured to create the recommended content list from the content list based on the contract information and the viewing history information, the recommended content list being one of a list of contents capable of being viewed and a list of contents capable of being stored in the content storage portion; and a unit configured to output, to the display apparatus, information used for displaying the recommended content list in a predetermined area other than a center area of a screen of the display apparatus, the recommended content list being smaller than the screen. The content storage portion is configured to store content. The contract information storage portion is configured to store contract information. The viewing history information storage portion is configured to store viewing history information.

In the embodiment of the present invention, since the recommended content list that is one of a list of contents capable of being viewed and a list of contents capable of being stored in the content storage portion by the user is created based on the contract information, all the contents in the recommended content list can be viewed by the user or stored. As a result, the user can reliably and easily select a content without confirming whether each content in the recommended content list can be viewed. In addition, in the past, in a case where the recommended content list is not smaller than the screen, the content that is being viewed has been stopped to display the recommended content list because the recommended content list hides the screen. According to the embodiment of the present invention, the recommended content list that is smaller than the screen is displayed in the predetermined area other than the center area of the screen, which can prevent the viewing screen from being hidden by the recommended content list during viewing of the content, and allows the user to easily select a content while watching the screen. Thus, the smaller recommended content list can increasingly bring opportunities of casually selecting other contents to the user.

The contract information includes one of first contract information and second contract information. The first contract information indicates that contents provided by the content server are all capable of being subjected to one of viewing and storing into the content storage portion, and the second contract information indicates that contents provided by the content server are capable of being subjected to one of viewing and storing into the content storage portion to a limited extent.

With this structure, based on the first contract information and the second contract information, the recommended content list and the contents can be provided to the user.

According to another embodiment of the present invention, there is provided a display processing system configured to receive a content list at a display processing apparatus, create a recommended content list, and output the recommended content list to a display apparatus. The display processing system includes the display processing apparatus and the display apparatus. The display processing apparatus includes a unit configured to receive a content list from a content server, a content storage portion configured to store a content, a contract information storage portion configured to store contract information, a viewing history information storage portion configured to store viewing history information, a unit configured to create the recommended content list from the content list based on the contract information and the viewing history information, the recommended content list being one of a list of contents capable of being viewed and a list of contents capable of being stored in the content storage portion, and a unit configured to output, to the display apparatus, information used for displaying the recommended content list in a predetermined area other than a center area of a screen of the display apparatus, the recommended content list being smaller than the screen. The display apparatus includes a unit configured to receive the information used for displaying the recommended content list on the screen, and a unit configured to display the recommended content list on the screen based on the received information.

In the embodiment of the present invention, since the recommended content list that is one of a list of contents capable of being viewed and a list of contents capable of being stored in the content storage portion by the user is created based on the contract information, all the contents in the recommended content list can be viewed by the user or stored. As a result, the user can reliably and easily select a content without confirming whether each content in the recommended content list can be viewed. In addition, in the past, in a case where the recommended content list is not smaller than the screen, the content that is being viewed has been stopped to display the recommended content list because the recommended content list hides the screen. According to the embodiment of the present invention, the recommended content list that is smaller than the screen is displayed in the predetermined area other than the center area of the screen, which can prevent the viewing screen from being hidden by the recommended content list during viewing of the content, and allows the user to easily select a content while watching the screen. Thus, the smaller recommended content list can increasingly bring opportunities of casually selecting other contents to the user.

The contract information includes one of first contract information and second contract information. The first contract information indicates that contents provided by the content server are all capable of being subjected to one of viewing and storing into the content storage portion, and the second contract information indicates that contents provided by the content server are capable of being subjected to one of viewing and storing into the content storage portion to a limited extent.

With this structure, based on the first contract information and the second contract information, the recommended content list and the contents can be provided to the user.

According to another embodiment of the present invention, there is provided a display processing method. The display processing method includes: storing a content, contract information, and viewing history information; receiving a content list from a content server; creating a recommended content list from the content list based on the contract information and the viewing history information, the recommended content list being one of a list of contents capable of being viewed and a list of contents capable of being stored in a content storage portion; and displaying the recommended content list in a predetermined area where the recommended content list is capable of being displayed, other than a center area of a screen, the recommended content list being smaller than the screen.

As described above, according to the embodiments of the present invention, the recommended content list indicating the contents that can be viewed by the user based on the contract information and the viewing history information can be displayed in the smaller area than the screen.

These and other objects, features and advantages of the present invention will become more apparent in light of the following detailed description of best mode embodiments thereof, as illustrated in the accompanying drawings.

BRIEF DESCRIPTION OF DRAWINGS

FIG. 2 is a diagram showing an example of the viewing history information;

FIG. 3 is a diagram showing an example of contents that can be viewed by a contract;

FIG. 6 is a diagram showing an example of a preference information list;

FIG. 7 is a diagram showing an example of a content list sorted based on preference levels;

FIGS. 9A to 9G are diagrams each showing a display screen in a predetermined step in the flowchart of FIG. 8;

DESCRIPTION OF PREFERRED EMBODIMENTS

Hereinafter, an embodiment of the present invention will be described with reference to the drawings.

Figure 1:
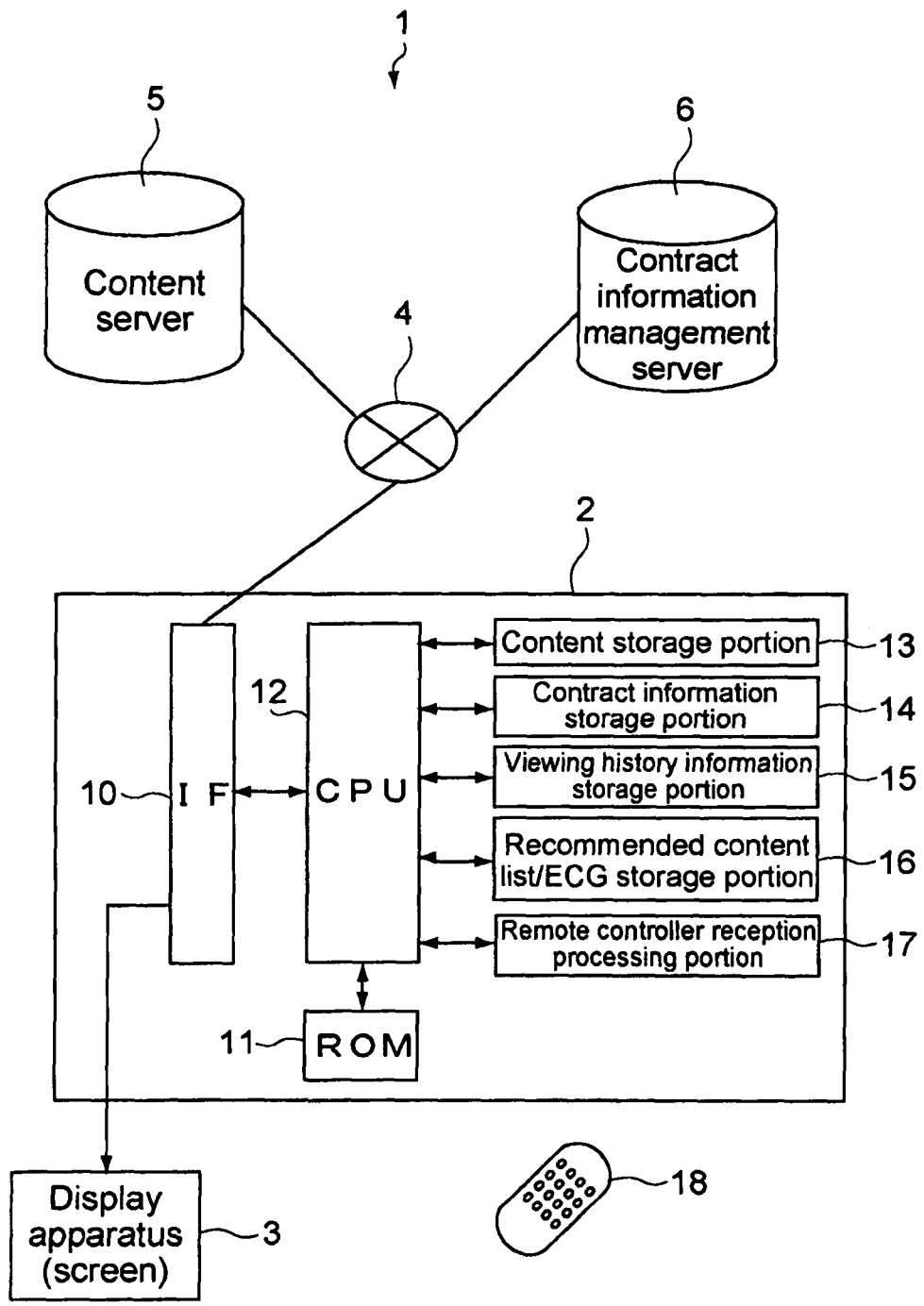
FIG. 1 is a block diagram showing a display processing system according to an embodiment of the present invention.

FIG. 1 is a block diagram showing a display processing system according to an embodiment of the present invention.

As shown in FIG. 1, a display processing system 1 includes a receiver 2 for an Internet protocol television (IPTV), a display apparatus 3, a content server 5, and a contract information management server 6. The display apparatus 3 displays a moving image and the like. The content server 5 and the contract information management server 6 are connected to the receiver 2 via the Internet 4.

The receiver 2 includes an interface (IF) 10 through which image information is received, a ROM 11, a CPU 12, a content storage portion 13, a contract information storage portion 14, a viewing history information storage portion 15, a recommended content list/electronic content guide (ECG) storage portion 16, and a remote controller reception processing portion 17.

A program executed by the CPU 12, an apparatus ID that is preset for each receiver 2, and the like are stored in the ROM 11.

The CPU 12 is, for example, a microprocessor, and controls respective portions of the receiver 2.

The content storage portion 13 is structured by, for example, an HDD (hard disc drive), which stores a content downloaded by the content server 5. The content storage portion 13 stores metadata (e.g., a title list) of the content stored therein. The title list is used for creating a recommended content list described later.

The contract information storage portion 14 stores user's contract information. The user's contract information includes first contract information which indicates that all the contents provided by the content server 5 can be viewed or can be downloaded and stored in the content storage portion 13, for example. Further, the user's contract information includes second contract information which indicates that the contents provided by the content server 5 can be viewed to a limited extent or can be downloaded and stored in the content storage portion 13 to a limited extent.

That is, the first contract information indicates that the contents can be viewed (downloaded) with no limitation, while the second contract information indicates that a package constituted of a plurality of (e.g., five) contents or a set number of contents selected from a predetermined range sectioned according to genres can be viewed. The contract information storage portion 14 is structured by a writable EP-ROM or the like, and stores a user ID and the like.

The viewing history information storage portion 15 stores user's viewing history information accumulated therein. The user's viewing history information includes information on a user's past viewing count for each genre of news, sports, a movie, a weather forecast, and the like, on a user's past viewing count for each program, or on a user's past viewing count for programs including a keyword set by the user.

The recommended content list/electronic content guide (ECG) storage portion 16 stores information on the recommended content list and an electronic content guide (ECG) described later.

The remote controller reception processing portion 17 receives and processes a signal from a remote controller 18.

FIG. 2 is a diagram showing an example of the viewing history information.

As shown in FIG. 2, the viewing history information includes attribute information including a genre name of a program that has been watched by the user during a predetermined time period and a viewing count of the program of the genre. FIG. 2 shows that programs relating to sports, movies, dramas, and music have been watched 20, 10, 15, and 5 times, respectively, during a predetermined time period, for example.

FIG. 3 is a diagram showing an example of contents that can be viewed according to a contract.

As shown in FIG. 3, the user can download programs of a sport a, a sport b, a movie a, a movie b, and a drama a, based on the second contract information (contract information according to which contents of the genres of, e.g., sports, movies, and dramas can be viewed).

Figure 4:
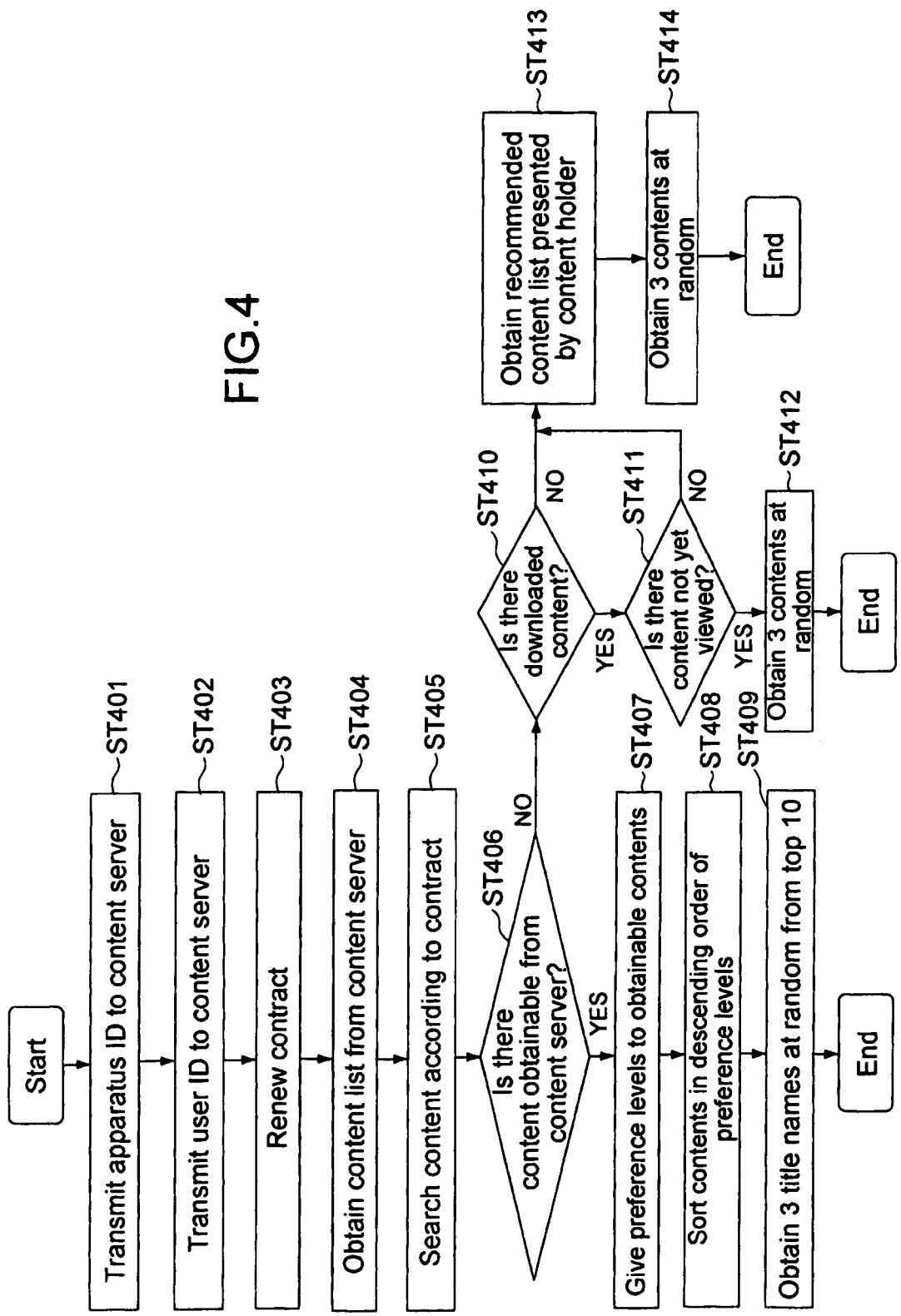
FIG. 4 is a flowchart for explaining an operation of obtaining the recommended content list.
Figure 5:
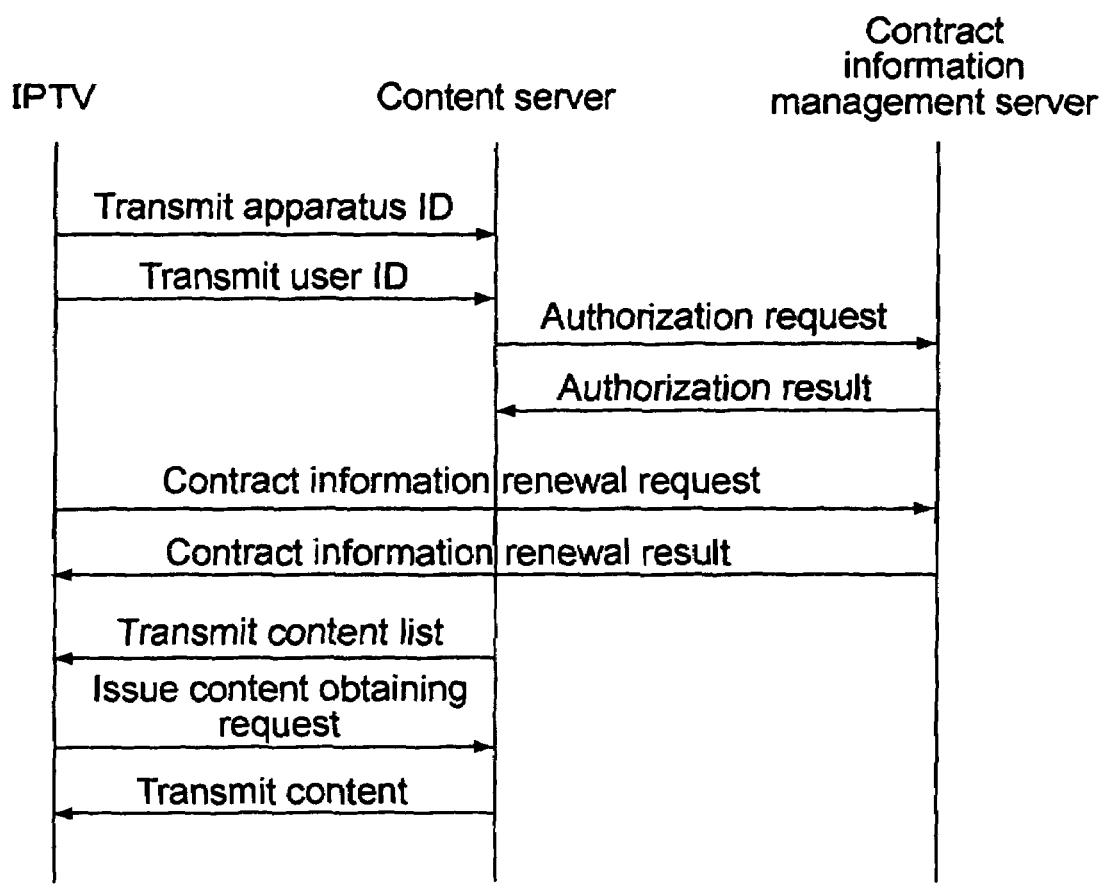
FIG. 5 is a timing chart for explaining the operation of obtaining the recommended content list.

FIG. 4 is a flowchart for explaining an operation of obtaining the recommended content list. FIG. 5 is a timing chart for explaining the operation of obtaining the recommended content list. FIG. 6 is a diagram showing an example of a preference information list. FIG. 7 is a diagram showing an example of a content list sorted based on preference levels.

The receiver 2 transmits an apparatus ID to the content server 5 (ST401) and transmits a user ID to the contents server 5 (ST402). The content server 5 receives the apparatus ID and the user ID and issues an authorization request to the contract information management server 6. The contract information management server 6 transmits an authorization result to the content server 5.

The receiver 2 issues a contract information renewal request to the contract information management server 6, and the contract information management server 6 transmits a contract information renewal result to the receiver 2. As a result, the contract is renewed (ST403).

The receiver 2 obtains a content list (title list) from the content server 5 and stores the content list in the recommended content list/ECG storage portion 16 (ST404).

The receiver 2 retrieves a content that can be viewed or downloaded, based on the contract information stored in the contract information storage portion 14 (ST405), and judges whether the content that can be viewed or downloaded is present or not (ST406). Based on the second contract information, the receiver 2 determines that the contents shown in FIG. 3 can be viewed or downloaded, for example.

In a case where the content that can be viewed or downloaded by the receiver 2 is present (YES in ST406), the receiver 2 assigns a preference level to each content (shown in FIG. 3) that can be viewed or downloaded according to the contract (ST407). Specifically, for example, the viewing counts for the genres shown in FIG. 2 are given as the preference levels to the contents (shown in FIG. 3) belonging to the respective genres, as shown in FIG. 6. For example, when the viewing count of (the genre of) the sports is 20 as shown in FIG. 2, the preference level of the sport a that can be viewed or downloaded according to the contract is set to 20 as shown in FIG. 6. When the viewing count of (the genre of) of the movie is 10 as shown in FIG. 2, the preference level of the movie a that can be viewed or downloaded according to the contract is set to 10 as shown in FIG. 6. The same holds true for the other contents shown in FIG. 6.

The receiver 2 sorts the contents in a descending order of preference levels based on the preference levels (shown in FIG. 6) assigned in ST407 (ST408). As a result, as shown in FIG. 7, the sport a whose preference level is 20 is ranked first, the sport b whose preference level is 20 is ranked second, the drama a whose preference level is 15 is ranked third, and the movie a whose preference level is 10 is ranked fourth.

The receiver 2 obtains, e.g., three program names at random from the top ten programs in a list (shown in FIG. 7) obtained in ST408 and creates a recommended content list 20 constituted of the three program names as shown in FIG. 7 (ST409).

When no content can be obtained in ST406 (NO in ST406), the receiver 2 judges whether any content has already been downloaded and stored in the content storage portion 13 (ST410).

When the receiver 2 determines that the content storage portion 13 has content stored therein in ST410 (YES in ST410), the receiver 2 judges whether any content that is not yet viewed is stored in the content storage portion 13 (ST411).

When the receiver 2 determines that the content storage portion 13 has a content that is not yet viewed (YES in ST411), e.g., three contents are obtained at random from contents that are not yet viewed, as the recommended content list (ST412).

When the receiver 2 determines that the content storage portion 13 has no content stored therein (NO in ST410) and has no content that is not yet viewed (NO in ST411), a recommended content list presented by a content holder is obtained (ST413). The content holder is a content list that is prepared at random in advance based on downloaded ECG information, for example.

For example, three contents are obtained at random from the recommended content list (ST414).

As described above, with the use of the viewing history information, the contract information, and the content list, the recommended content list 20 is created. The recommended content list 20 and the like are displayed so as to be smaller than the screen, in a predetermined area other than a center area of the screen on the display apparatus 3.

Figure 8:
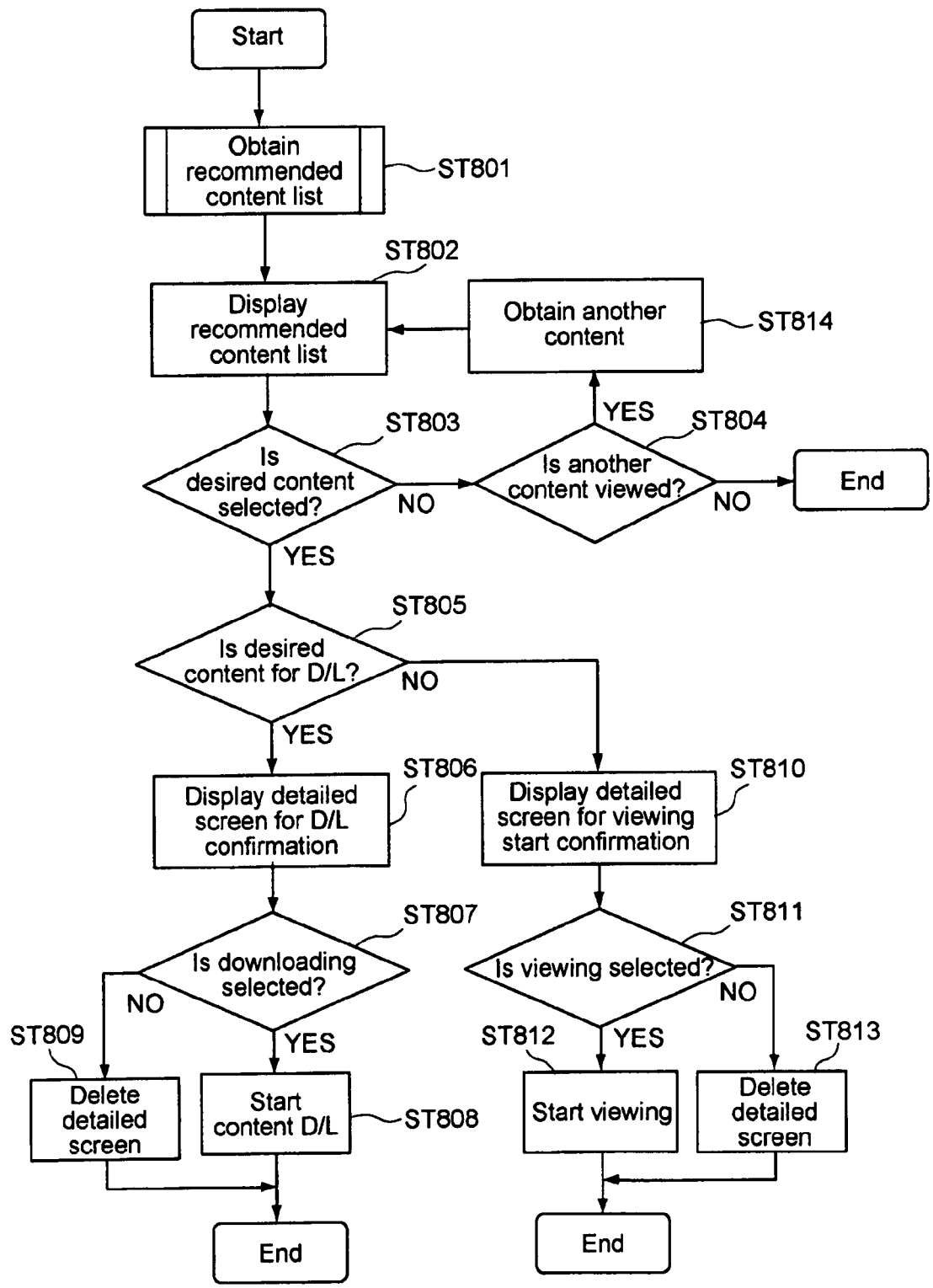
FIG. 8 is a flowchart showing a process from when the recommended content list 20 shown in FIG. 4 is displayed on the screen until downloading or viewing of the content is terminated.
Figure 10:
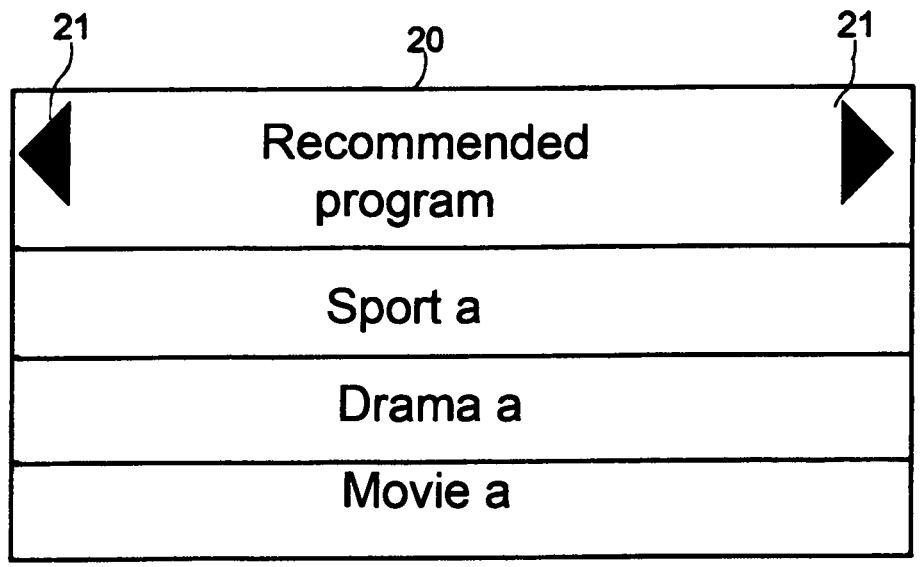
FIG. 10 is a diagram showing details of the recommended content list.

FIG. 8 is a flowchart showing a process from when the recommended content list 20 shown in FIG. 7 is displayed on the screen until downloading or viewing of the content is terminated. FIGS. 9A to 9G are diagrams each showing a display screen in a predetermined step in the flowchart of FIG. 8. FIG. 10 is a diagram showing details of the recommended content list.

For example, when a predetermined button of the remote controller 18 is pressed while a user watches a program shown in FIG. 9A, the remote controller 18 transmits an instruction signal for displaying the recommended content list 20. The receiver 2 receives the instruction signal from the remote controller 18 and obtains the recommended content list 20 according to the flowchart of FIG. 4 as described above (ST801).

It is to be noted that, when the user presses another button of the remote controller while viewing the content, the receiver 2 similarly displays a menu list on a screen 3a as shown in FIG. 9C. The menu list includes items of the "content list", a "recommended program" for displaying the recommended content list, and a "setting" for displaying a screen to perform various kinds of settings. When the "recommended program" in the menu list is selected, the receiver 2 also obtains the recommended content list 20 according to the flowchart of FIG. 4 (ST801).

As shown in FIG. 9B, the receiver 2 displays the recommended content list 20 not in the center area of the screen 3a of the display apparatus 3, but in proximity to a corner portion thereof, with the recommended content list 20 being smaller than the screen 3a (ST802). Therefore, as shown in FIG. 9B, the recommended content list 20 is displayed so as not to hide the screen that is being watched. It is to be noted that the size and the position of the recommended content list 20 are not limited as long as the screen being watched is not hidden.

The receiver 2 judges whether a content in the recommended content list 20 is selected (ST803).

When the content in the recommended content list 20 is not selected (NO in ST803), the receiver 2 judges whether another content in the recommended content list 20 is to be selected, based on whether buttons 21 shown in FIG. 10 are pressed (ST804).

When the buttons 21 are pressed (YES in ST804), for example, three contents are selected from among seven programs obtained by subtracting three programs that are already displayed from the top ten programs presented in the descending order of the preference levels, which are obtained in ST408 of FIG. 4 (ST814). Then, the process returns to ST802, and the obtained three recommended contents are displayed on the screen 3a (ST802).

When the buttons 21 are not pressed (NO in ST804), for example, the recommended content list is deleted after a predetermined time period and the process is terminated.

When a content in the recommended content list 20 is selected in ST803 (YES in ST803), it is judged whether the selected content is a content for download (ST805).

When the selected content is a content for download (YES in ST805), a screen for details to confirm whether to start the download is displayed as shown in FIG. 9D (ST806).

The receiver 2 judges whether a "download" button shown in FIG. 9D is selected (ST807).

When the "download" button shown in FIG. 9D is selected (YES in ST807), the receiver 2 sends a request of obtaining a content to the content server 5 and starts downloading the content (ST808). During the download, a screen showing that the download is in progress is displayed as shown in FIG. 9E. When the download is terminated, a screen showing that the download is terminated is displayed, to terminate the processing.

When a "cancel" button shown in FIG. 9D is selected (NO in ST807), the download is not started and the screen for details is deleted (ST809), to terminate the processing.

When the content selected in ST803 is not the content for download (NO in ST805) but a content that can be viewed, a screen for details to confirm whether to start viewing the content is displayed as shown in FIG. 9F (ST810).

The receiver 2 judges whether a "view" button shown in FIG. 9F is selected (ST811).

When the "view" button shown in FIG. 9F is selected (YES in ST811), the receiver 2 sends a request of obtaining a content to the content server 5 to allow the user to start viewing the content (ST812). During the viewing of the content, a screen being watched is displayed as shown in FIG. 9G. When the program watched is ended, a screen showing that the program is ended is displayed, to terminate the processing.

When a "cancel" button shown in FIG. 9F is selected (NO in ST811), viewing of the content is not started and the screen for details is deleted (ST813), to terminate the processing.

As described above, according to this embodiment, when the user selects a content while viewing another content, a content that can be viewed or downloaded is obtained, according to the contract, from among contents other than ones that require a fee in a complicate way or require a procedure for obtaining a license (ST405), a content suited to the preference of the user is obtained to create the recommended content list 20 (ST407 to ST409) based on the viewing history information, and the recommended content list 20 is displayed on the screen 3a of the display apparatus 3 (ST802). Thus, the user can reliably and easily select the content that suits his/her own preference and that can be viewed, from the recommended content list 20. In addition, the recommended content list 20 is displayed not in the center area of the screen 3a but in the corner portion thereof, with the recommended content list 20 being smaller than the screen 3a, and thus the user can easily select the content from the recommended content list 20 with a single action while watching the screen.

That is, because of variety in metadata of the contents, the amount of information is further increased. When a large amount of information is displayed on the screen 3a, the screen viewability becomes poor or the content being watched is required to be stopped. However, according to this embodiment, when a content is selected during viewing of another content, information on titles can be efficiently displayed on the screen 3a with the use of an important function of the receiver 2 for compactly displaying the recommended content list 20, so that the information can be easily selected by the user.

As shown in FIG. 10, the recommended content list 20 is provided with the buttons 21 on the same line as the item of the "recommended program". As shown in FIG. 8, when the buttons 21 are pressed (YES in ST804), for example, three contents are obtained by being selected from seven programs obtained by subtracting three programs that are already displayed from the top ten programs presented in the descending order of the preference levels, which are obtained in ST408 of FIG. 4 (ST814). Then, the process returns to ST802, and the obtained three recommended contents are displayed on the screen 3a (ST802). Accordingly, the other recommended contents can be easily displayed while preventing an increase in number of lines (e.g., three) on which contents are listed in the recommended content list 20. Thus, the content desired to be viewed can be easily selected without stopping the program displayed on the screen being watched.

As shown in FIG. 10, in the recommended content list 20, a plurality of contents are listed. For example, when an item of the "sport a" is selected, detailed information on the selected content is displayed as shown in FIG. 9D or 9F. As a result, it becomes easy to view a content desired to be viewed or store a content desired to be stored in the content storage portion 13, for example.

Figure 11:
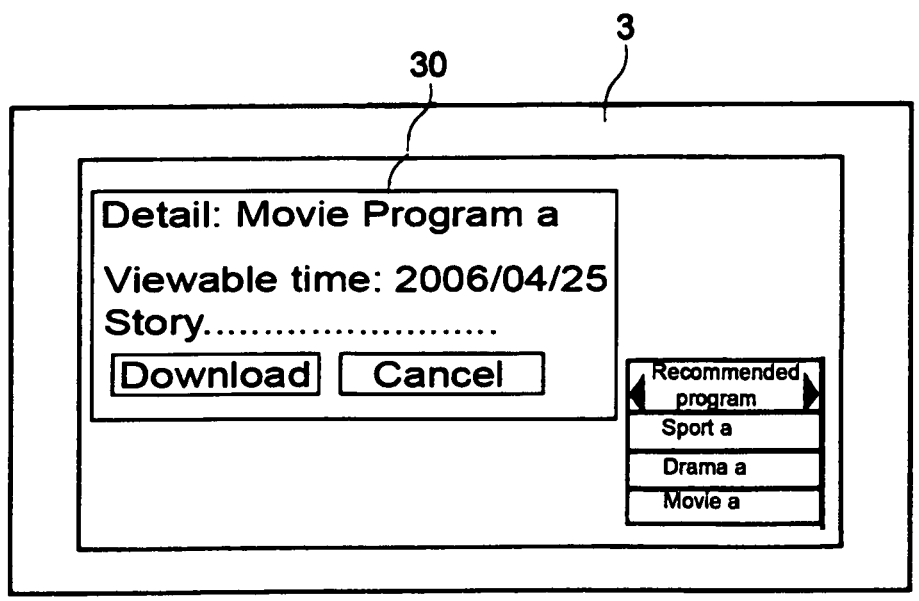
FIG. 11 is a diagram showing a screen for details displayed on the screen according to a modified example.

FIG. 11 is a diagram showing a screen for details displayed on the screen 3a according to a modified example.

In this modified example and the subsequent ones, the same constituents as those in the above embodiment are denoted by the same reference numerals or symbols. A description on the same constituents is omitted and different points will be described.

As shown in FIG. 11, in this modified example, a position where a content is selected and a position where the screen for details is displayed are different from the positions as indicated in FIG. 9B and FIGS. 9D and 9F, respectively.

As shown in FIG. 11, when a content in the recommended content list 20 is selected, a detail screen 30 that shows detailed information on the selected content is displayed in an area that does not overlap with an area on which the recommended content list 20 is displayed, on the screen 3a. Thus, the user can view the detailed information on the selected content and the recommended content list 20 on the screen 3a at the same time, which increases operability.

It is to be noted that the present invention is not limited to the above embodiments, and can be variously changed within the scope of the technical idea of the present invention.

The receiver 2 may create the recommended content list 20 based on a content relating to a content being viewed, for example. The content relating to the content being viewed refers to, when the user is watching a sports program, another sports program, for example. Programs are uniquely numbered for identifying genres thereof. Based on the numbers, it is judged whether the program is a sports program. Accordingly, for example, when it is determined that the sports program is being viewed, the recommended content list relating to the sports can be obtained. More appropriate content can be recommended.

In the above embodiment, the ECG is stored from the content server 5 into the recommended content list/ECG storage portion 16. Alternatively, the receiver 2 may download the ECG from the content server 5 as necessary.

In the above embodiment, as shown in FIG. 1, the receiver 2 and the display apparatus 3 are separately structured. Alternatively, the receiver 2 may include the display portion. Further, the receiver 2 receives the signal from the remote controller 18. Alternatively, a signal may be transmitted from another input apparatus such as a keyboard or a mouse to the receiver 2.

In the above embodiment, the content list (title list) is stored in the content storage portion 13. Alternatively, the content list (title list) may be stored in a storage apparatus that is externally connected to the receiver 2.

What is claimed is:

1. A display processing apparatus, comprising:
    means for receiving a content list from a content server;
    a content storage portion configured to store a content;
    a contract information storage portion configured to store contract information;
    a viewing history information storage portion configured to store viewing history information;
    means for creating a recommended content list from the content list based on the contract information and the viewing history information, the recommended content list being one of a list of contents capable of being viewed and a list of contents capable of being stored in the content storage portion, the recommend list including a predetermined number of contents randomly selected from a list of top-rated contents;
    a screen capable of displaying the recommended content list; and
    means for displaying the recommended content list in a predetermined area other than a center area of the screen, the recommended content list being smaller than the screen,
    wherein the contents are transmitted via the Internet, and
    wherein when all contents included in the content list are prevented from being obtained based on the contract information, the means for creating the recommended content list searches contents that are downloaded and stored in the content storage portion to create the recommended content list.

2. The display processing apparatus according to claim 1, wherein the contract information includes one of first contract information and second contract information, the first contract information indicating that contents provided by the content server are all capable of being subjected to one of viewing and storing into the content storage portion, the second contract information indicating that contents provided by the content server are capable of being subjected to one of viewing and storing into the content storage portion to a limited extent.

3. The display processing apparatus according to claim 1, wherein the recommended content list includes a plurality of contents indicated in a list form, and one of the plurality of contents is selected to enable one of viewing the selected content and storing the selected content into the content storage portion to be started.

4. The display processing apparatus according to claim 1, wherein one of a plurality of contents is selected from the recommended content list to display detailed information of the selected content in an area on the screen, other than an area where the recommended content list is displayed on the screen.

5. The display processing apparatus according to claim 1, wherein the means for creating the recommended content list creates the recommended content list based on a content relating to a content that is being viewed.

6. A display processing apparatus configured to receive a content list and output a recommended content list to a display apparatus, comprising:
    means for receiving a content list from a content server;
    a content storage portion configured to store a content;
    a contract information storage portion configured to store contract information;
    a viewing history information storage portion configured to store viewing history information;
    means for creating a recommended content list from the content list based on the contract information and the viewing history information, the recommended content list being one of a list of contents capable of being viewed and a list of contents capable of being stored in the content storage portion, the recommend list including a predetermined number of contents randomly selected from a list of top-rated contents; and
    means for outputting, to the display apparatus, information used for displaying the recommended content list in a predetermined area other than a center area of a screen of the display apparatus, the recommended content list being smaller than the screen,
    wherein the contents are transmitted via the Internet, and
    wherein when all contents included in the content list are prevented from being obtained based on the contract information, the means for creating the recommended content list searches contents that are downloaded and stored in the content storage portion to create the recommended content list.

7. The display processing apparatus according to claim 6, wherein the contract information includes one of first contract information and second contract information, the first contract information indicating that contents provided by the content server are all capable of being subjected to one of viewing and storing into the content storage portion, the second contract information indicating that contents provided by the content server are capable of being subjected to one of viewing and storing into the content storage portion to a limited extent.

8. A display processing system configured to receive a content list at a display processing apparatus, create a recommended content list, and output the recommended content list to a display apparatus, comprising:
    the display processing apparatus including
        means for receiving the content list from a content server,
        a content storage portion configured to store a content,
        a contract information storage portion configured to store contract information,
        a viewing history information storage portion configured to store viewing history information,
        means for creating the recommended content list from the content list based on the contract information and the viewing history information, the recommended content list being one of a list of contents capable of being viewed and a list of contents capable of being stored in the content storage portion, the recommend list including a predetermined number of contents randomly selected from a list of top-rated contents, and
        means for outputting, to the display apparatus, information used for displaying the recommended content list in a predetermined area other than a center area of a screen of the display apparatus, the recommended content list being smaller than the screen; and
    the display apparatus including
        means for receiving the information used for displaying the recommended content list on the screen, and
        means for displaying the recommended content list on the screen based on the received information,
    wherein the contents are transmitted via the Internet, and
    wherein when all contents included in the content list are prevented from being obtained based on the contract information, the means for creating the recommended content list searches contents that are downloaded and stored in the content storage portion to create the recommended content list.

9. The display processing system according to claim 8,
wherein the contract information includes one of first contract information and second contract information, the first contract information indicating that contents provided by the content server are all capable of being subjected to one of viewing and storing into the content storage portion, the second contract information indicating that contents provided by the content server are capable of being subjected to one of viewing and storing into the content storage portion to a limited extent.

10. A display processing method, comprising:

storing a content, contract information, and viewing history information;

receiving a content list from a content server;

creating a recommended content list from the content list based on the contract information and the viewing history information, the recommended content list being one of a list of contents capable of being viewed and a list of contents capable of being stored in a content storage portion, the recommend list including a predetermined number of contents randomly selected from a list of top-rated contents; and displaying the recommended content list in a predetermined area where the recommended content list is capable of being displayed, other than a center area of a screen, the recommended content list being smaller than the screen, wherein the contents are transmitted via the Internet, and wherein when all contents included in the content list are prevented from being obtained based on the contract information, the means for creating the recommended content list searches contents that are downloaded and stored in the content storage portion to create the recommended content list.

* * * * *